(12) United States Patent
Natsume et al.

(10) Patent No.: US 7,088,286 B2
(45) Date of Patent: Aug. 8, 2006

(54) APPARATUS FOR DETECTING DIRECTION OF TARGET USING DIFFERENCE IN PHASE OF RADIO WAVE SIGNALS RECEIVED THROUGH PLURAL CHANNELS

(75) Inventors: Kazuma Natsume, Kariya (JP); Hiroaki Kumon, Kariya (JP); Kenta Hoki, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/717,468

(22) Filed: Nov. 21, 2003

(65) Prior Publication Data

US 2006/0132353 A1     Jun. 22, 2006

(30) Foreign Application Priority Data

Nov. 22, 2002  (JP)  ............................. 2002-339601

(51) Int. Cl.
*G01S 13/44* (2006.01)
(52) U.S. Cl. ................................................ 342/147
(58) Field of Classification Search ................ 342/146, 342/139, 133, 147, 127
See application file for complete search history.

(56) References Cited

U.S. PATENT DOCUMENTS 4,160,974 A * 7/1979 Stavis ......................... 342/157

6,246,359 B1    6/2001 Asano et al. ................ 342/158
2004/0252047 A1* 12/2004 Miyake et al. .............. 342/146

FOREIGN PATENT DOCUMENTS

| JP | 2-290574 | 11/1990 |
|---|---|---|
| JP | 9-178839 | 7/1997 |
| JP | 10-206516 | 8/1998 |
| JP | 2000-230974 | 8/2000 |
| JP | 2000230974 | * 8/2000 |
| WO | WO99/34234 | 7/1999 |

* cited by examiner

Primary Examiner—Daniel Pihulic
(74) Attorney, Agent, or Firm—Posz Law Group, PLC (57) ABSTRACT

An apparatus for detecting a direction of a target is provided. The apparatus transmits and receives radio waves through a plurality of transmission/reception channels causing a phase difference in signals to be received through the transmission/reception channels and calculates the direction based on the phase difference. The apparatus comprises a direction calculating device, range determining device, and direction correcting device. The direction calculating device calculates the direction of the target based on the phase difference in the received signals on the assumption that the phase difference is within a range of $-\pi$ to $+\pi$ [rad]. The range determining device determines that the target exists in any of azimuthal angle ranges each corresponding to ranges defined by $(2m-1)\pi$ to $(2m+1)\pi$ [rad] (m is an integer). The direction correcting device corrects the direction according to a range-determined result.

19 Claims, 9 Drawing Sheets

APPARATUS FOR DETECTING DIRECTION OF TARGET USING DIFFERENCE IN PHASE OF RADIO WAVE SIGNALS RECEIVED THROUGH PLURAL CHANNELS

BACKGROUND OF THE INVENTION

1. Technical Field

The present invention relates to an apparatus for detecting a direction of a target, and in particular, to the apparatus equipped with both of a plurality of channels of radio waves to be transmitted and received through antennas and means for detecting the direction of the target using a difference in phase of the radio wave signals received through the channels.

2. Related Art

Among conventional techniques for detecting a direction of a target, one type of technique has been realized by using radio waves. Practically, such detection techniques have been known as a mono-pulse method, a phased array method, a digital beam forming (DBF) method, and others. These detection techniques use a difference in phase of signals received through a plurality of antenna elements.

Figure 1A:
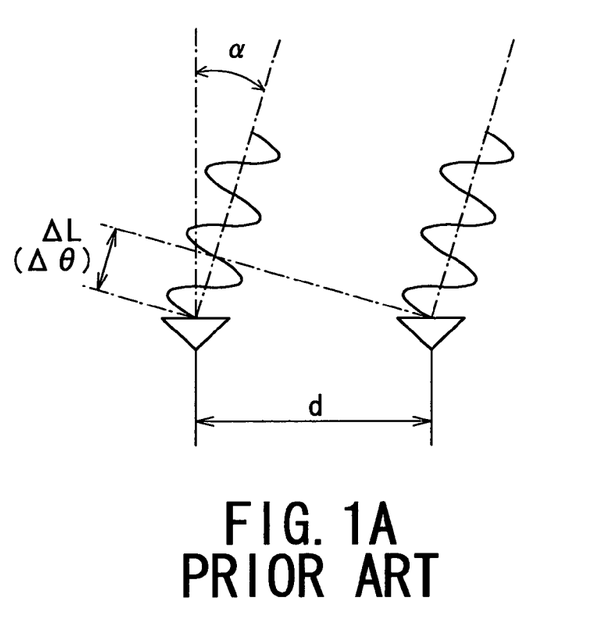
FIGS. 1A and 1B are illustrations that explain the principle of detection of an azimuthal direction based on a difference in phase.

Specifically, as shown in FIG. 1A, these detection techniques require combinations of antenna elements (called "channels"), which give a difference in paths "$\Delta L$" to radio waves to be transmitted and received to and from a target. A direction "$\alpha$" of the target, which reflected the radio waves, is thus obtained based on a phase difference $\Delta L$ (rad) caused between the signals received through the plural channels.

Figure 2:
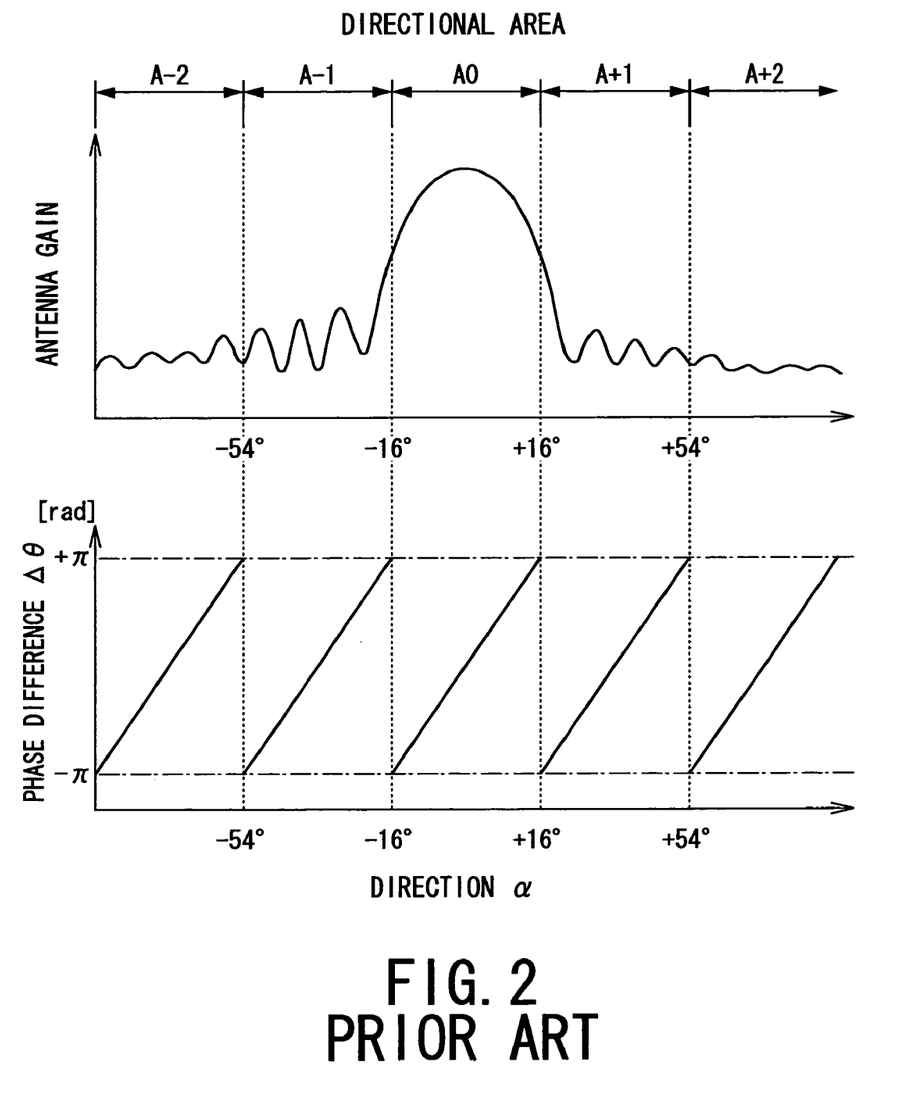
FIG. 2 shows a relationship between a direction and a phase difference and an example of how to set an antenna characteristic.

In such a configuration, however, as shown in FIG. 2, because changes in the phase have periodicity, aliasing in the phase will be caused, thus making it impossible to distinguish $\Delta\theta = \theta_0$ ($|\theta_0| < \pi$) from $\Delta\theta = \theta_0 \pm 2n\pi$ ($n=1, 2, \ldots$). Hence if a target is located in an azimuthal angle region A0 (hereinafter referred to as "directional area") corresponding to a range of $-\pi$ to $+\pi$ [rad] in the phase difference $\Delta\theta$, the direction of the target can be detected correctly. It is however impossible to correctly detect the target if the target exists outside the directional area A0, that is a directional area Am which corresponds to a range of $(2m-1)\pi$ to $+(2m+1)\pi$ [rad] (m is an integer other than 0) in the phase difference $\Delta\theta$. In this case, the target is erroneously detected such that it is located within the directional area A0 (refer to a dashed line in FIG. 3).

Figure 3:
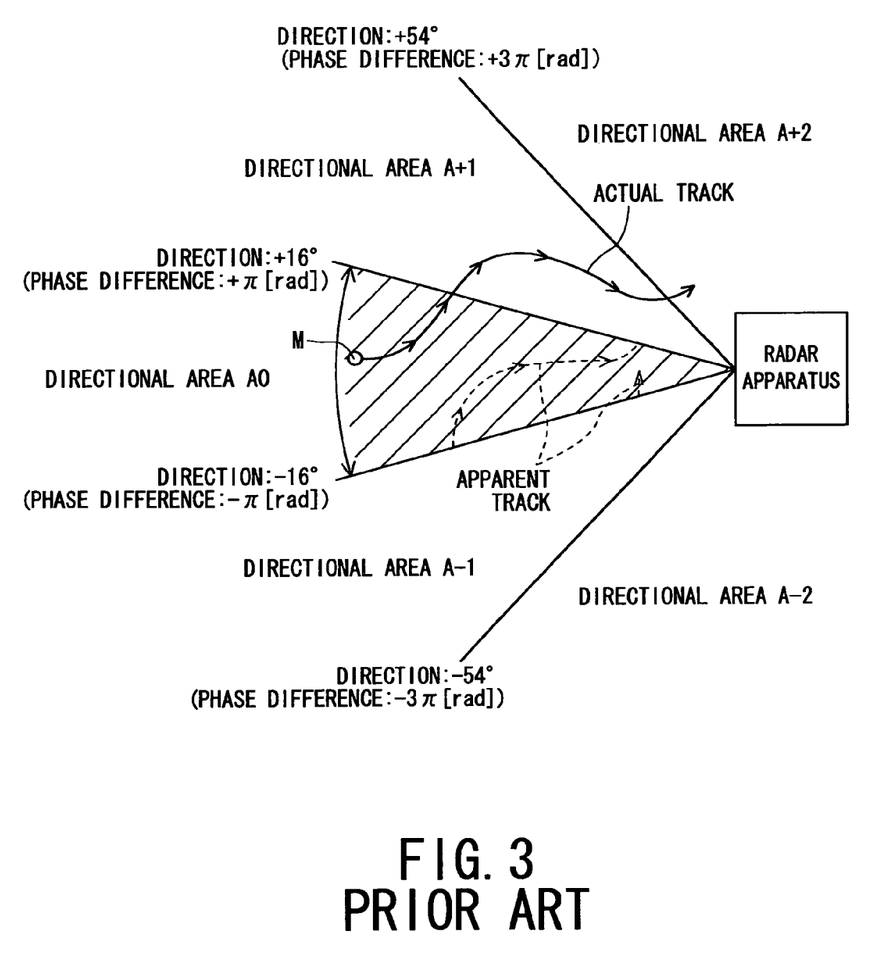
FIG. 3 explains a difficulty with which a conventional apparatus is confronted (this figure is also used to explain the operation carried out by the present invention)

To be more specific about FIG. 3, the situation shown therein explains a target M that has actually moved from the directional area A0 to an adjacent directional area A+1 (refer to a solid line). Nevertheless, the target M is detected as if it has moved from an adjacent area A−1 to the directional area A0 (refer to the dashed line). This erroneous detection will occur whenever the target crosses each boundary between the directional areas Am.

In the configuration shown in FIGS. 2 and 3, the wavelength of the radio waves is 3.9 mm (appr. 77 GHz), an interval "d" of arrangement between antenna elements (refer to FIGS. 1A and 1B) is 7.2 mm, the directional area A0 is −16 to +16 degrees, and an angular width of each directional area Am is 32 degrees.

Figure 1B:
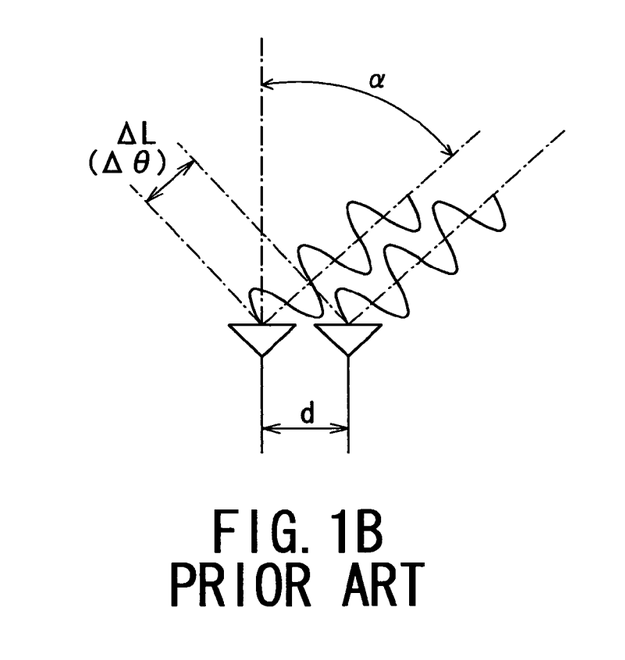
Figure 4:
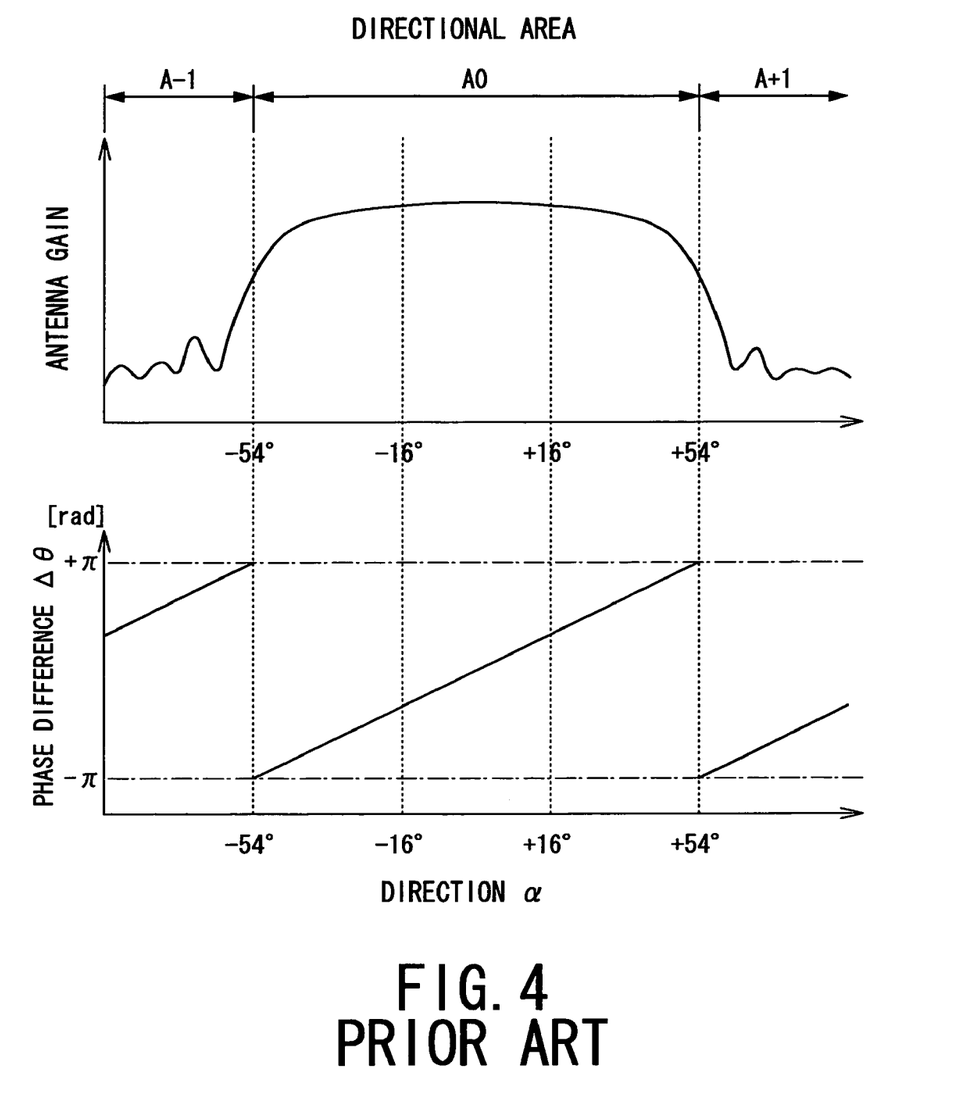
FIG. 4 shows a further relationship between a direction and a phase difference and a further example of how to set an antenna characteristic.

In order to prevent the erroneous detection due to the phase aliasing, it is general that the directivity of the antenna is made narrowed. The directivity is defined as a half angular-value width at which the antenna has a half a maximum gain. Narrowing the directivity prevents reception of the radio waves transmitted from outside the directional area A0. An alternative countermeasure is that, as shown in FIG. 1B, the interval "d" of arrangement of the antenna elements is made narrower, which results in a widened angular width of the directional area A0. FIG. 4 shows a relationship of the phase difference $\Delta\theta$ and the direction "$\alpha$," which is gained when the arrangement interval "d" of the antenna elements is made narrower. In this FIG. 4, it can be understood that a target-detectable range (i.e., the directional area A0) is widened, because an amount of rotation of the phase difference $\Delta\theta$ along the direction is made less.

The above techniques for avoiding the erroneous detection are often used by a direction detecting apparatus, of which criteria is based on the phase difference.

Still, Japanese Patent Laid-open publication No. 2000-230974 discloses another erroneous-detection preventing technique. This prevention technique is realized by an apparatus in which two antenna systems are arranged, whose intervals of the antennas are different from each other between the two systems. Based on a difference in the phase between received signals in each antenna system, an arrival direction of the radio waves is sequentially determined, every antenna system, in consideration of the phase aliasing, and when the two-system antenna determine the same direction, the direction is adopted as being a direction which is free from the erroneous detection.

However, this technique is still confronted with some difficulties. One is incompleteness in the foregoing erroneous detection. When the directivity of an antenna is desired to be narrowed, it is very difficult to design an antenna system such that a gain thereof is sharply changed between the inside and the outside of the direction area A0. Thus it is impossible to completely shut down the radio waves coming from the region outside the directional area A0, thus making it difficult to avoid the erroneous detection without fail.

Another difficulty is a lowered performance of the antenna system. When the arrangement interval between two antenna elements is made narrower, an aperture area of each antenna element will become insufficient. This reduces the performance of the antenna system; for example, a maximum detection distance is lowered.

Further, a narrowed arrangement interval between the two antenna elements brings about another problem in the phased-array method and the DBF method. In such methods, it is preferable to make the entire aperture of an antenna array larger, in cases where resolution to identify an arrival direction of radio waves is desired to increase. However, since the arrangement interval between the antenna elements is made narrower, a very large number of antenna elements are required to obtain a certain necessary size of the aperture as the whole antenna array. Thus both of labor for mounting the antenna elements and a manufacturing cost are obliged to be increased.

In the case that the apparatus employs the two antenna systems of which arrangement intervals differ from each other, the construction of the apparatus becomes complicated. In addition, an amount of calculation necessary for possessing reception signals rises remarkably, because the same reception processing should be performed for each antenna system.

SUMMARY OF THE INVENTION

The present invention has been made with due consideration to the foregoing difficulties, and an object of the present invention is to provide a direction detecting apparatus capable of preventing the erroneous detection due to phase aliasing, with the apparatus construction still made compact and an amount of reception processing kept lower.

In order to accomplish the foregoing object, as one aspect of the present invention, there is provided an apparatus for detecting a direction of a target to be detected by transmitting and receiving radio waves through a plurality of transmission/reception channels causing a phase difference in signals to be received through the transmission/reception channels and calculating the direction based on the phase difference. At least one of transmission and reception antennas is provided to form the plurality of transmission/reception channels. The apparatus comprises a direction calculating device, a range determining device, and a direction correcting device. Of these, the direction calculating device calculates the direction of the target based on the phase difference in the received signals on the assumption that the phase difference is within a range of $-\pi$ to $+\pi$ [rad]. The range determining device determines that the target exists in any of azimuthal angle ranges each corresponding to ranges defined by $(2m-1)\pi$ to $(2m+1)\pi$ [rad] (m is an integer). The direction correcting device corrects the direction calculated by the direction calculating device according to a result determined by the range determining device.

Practically, if the range determining device determines an azimuthal angel range corresponding to a range of which phase difference is within $-\pi$ to $+\pi$ (m=0), there is no need to correct the direction calculated by the direction calculating device. In contrast, in the case that azimuthal range ranges other than the above (i.e, m is not equal to 0) is determined, the direction calculated by the direction calculating device is subject to the correction that "m·α" is added to the direction calculated by the direction calculating device, wherein "α" is an angle indicating an angular width of each azimuthal angle ranges.

Thus, the direction detecting apparatus according to the present invention is able to determine an azimuthal angle range in which a target resides by using the factor other than the phase difference between received signals. It is therefore possible to detect the direction of the target correctly and non-erroneously, even when there occurs aliasing in the phases of the received signals.

Preferably, the apparatus may comprise a memory device for memorizing history information in relation to positional information including at least the direction target by target, wherein the range determining device is configured to determine the azimuthal angle range on the basis of the history information memorized by the memory device.

The history of the memorized positional information can be used to infer a moving direction of a target, so that, when the target moves from a certain azimuthal angle range into an adjacent azimuthal angle range, it is simple to determine that the target moved into which azimuthal angle range.

It is still preferred to include information about a distance to the target into the positional information. In this case, when finding out that both of a target which was detected near one boundary of an azimuthal angle range and a further target newly detected near the other boundary of the azimuthal angle range are located to have the same distance, it can be determined such that both the targets are the same and moved over the azimuthal angel range. Hence reliability of detection of the targets can be improved more.

It is also preferred that the apparatus further comprises an imaging device configured to acquire a two-dimensional image through a field of view of an angular range being wider than and including the azimuthal angle range corresponding to the range of $-\pi$ and $+\pi$ [rad] of the phase difference; and a distance calculating device configured to calculate a difference of the target based on transmitted and received signals of the radio waves. In this configuration, preferably, the range determining device comprises: a mapping member configured to map, every azimuthal angle range, a position at which the target is to be detected on the two-dimensional image acquired by the imaging device on the basis of each direction respectively calculated using the phase difference between the received signals on the assumption that the phase difference is within each of ranges defined by $(2m-1)\pi$ to $(2m+1)\pi$ [rad] and the distance calculated by the distance calculating device; a first determination member configured to determine whether or not the target is imaged at each position on the two-dimensional image acquired by the mapping member; and a second determining member configured to determine the azimuthal angle range in which the target exists, on the basis of a determined result of the first determination member.

Hence, when the imaging device is provided, the imaging device can be utilized to prevent erroneous detection of the targets resulting from the phase aliasing.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of the present invention will now be described. In the following embodiments, the direction detecting apparatus according the present embodiment is reduced into practice as an on-vehicle radar apparatus.

(First embodiment)

Figure 5:
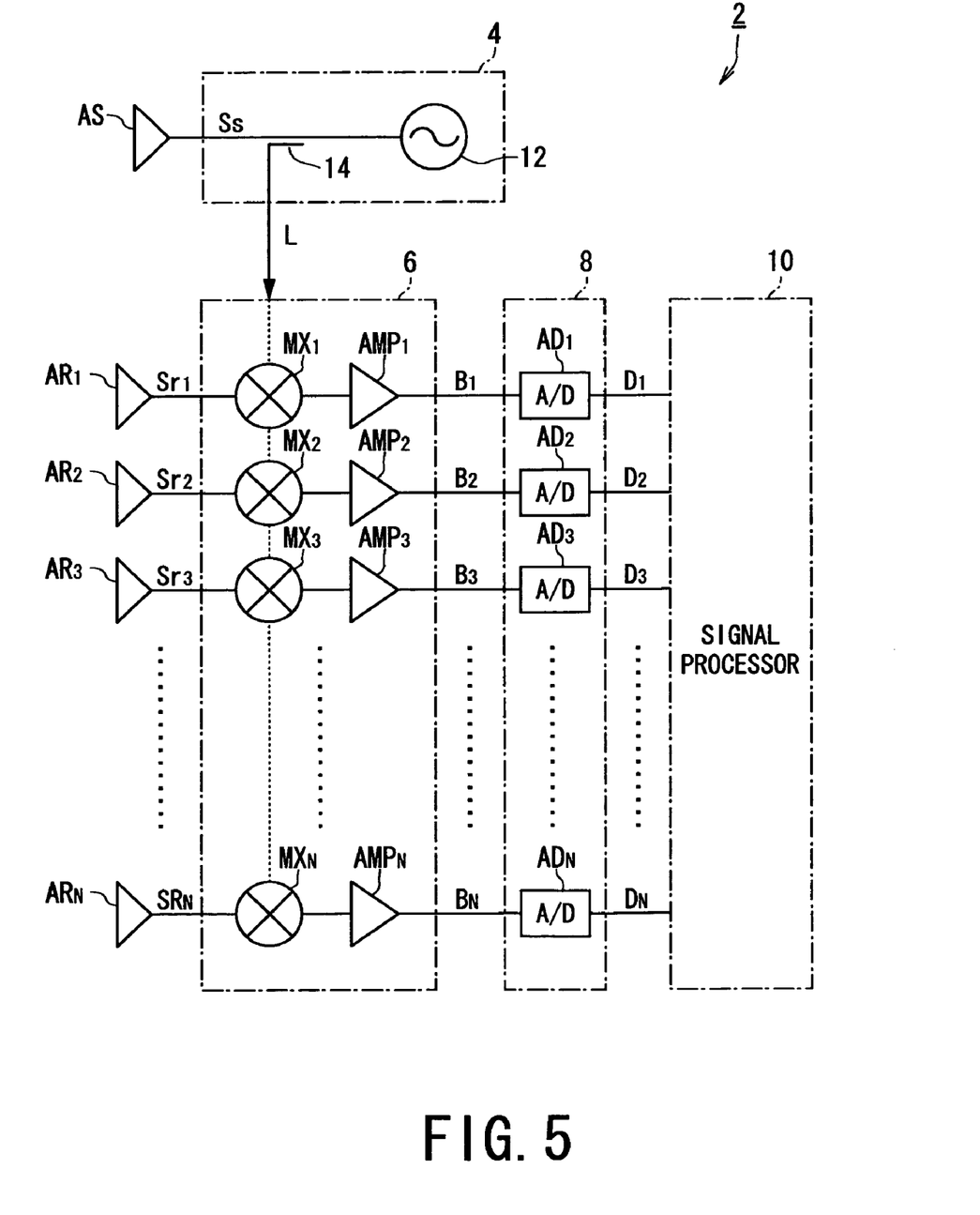
FIG. 5 is a block diagram showing the entire configuration of a radar apparatus serving as a direction detecting apparatus according to a first embodiment of the present invention.

FIG. 5 shows in block form the entire configuration of an on-vehicle radar apparatus 2 according to the first embodiment.

As shown in FIG. 1, the radar apparatus 2 is equipped with a transmitter 4, an N-channel receiver 6, an N-channel A/D converter unit 8, and a signal processor 10.

The transmitter 4 is constructed to a millimeter wave-band radar wave via a transmission antenna AS. The receiver 6 is coupled with N-piece reception antenna $AR_1$ to $AR_N$ arranged in line at equal intervals (in this embodiment, N=8). And the receiver 6 receives, through the reception antennas $AR_1$ to $AR_N$, a radar wave (hereafter referred to as reflected wave) transmitted by the transmitter 4 and reflected from landmark objects (barriers), such as leading vehicles and roadside objects, and produces N-piece beat signals $B_1$ to $B_N$, which will be detailed later.

The A/D converter unit 8 has N-piece A/D converters $AD_1$ to $AD_N$ respectively receiving the beat signals $B_1$ to $B_N$ produced by the receiver 6. Each of the converters $AD_1$ to $AD_N$ samples each of the received beat signals $B_1$ to $B_N$ to convert it to corresponding digital data $D_1$ (to $D_N$). The signal processor 10 takes in the digital data $D_1$ to $D_N$ from the A/D converters $AD_1$ to $AD_N$ and performs various kinds of predetermined signal processing with those data $D_1$ to $D_N$.

To be more specific, the transmitter 4 is equipped with a radio frequency oscillator 12 and a distributor 14. Of these components, the radio frequency oscillator 12 oscillates a millimeter wave-band radio frequency signal modulated such that the frequency gradually increases and decreases over time in a linear manner. The distributor 14 is configured to distribute, in power, an output from the radio frequency oscillator 12 into a transmission signal Ss and a local signal L. The transmission signal Ss is then sent to the transmission antenna AS, while the local signal L is supplied to the receiver 6.

The receiver 6 has a radio-frequency-dedicated mixers $MX_i$ (i=1 to N) each inserted into each of N-channel reception paths to receive a reception signal $Sr_i$ coming from each reception antenna $AR_i$ and amplifiers $AMP_i$ each inserted into each reception path, but after each mixer $MX_i$.

Each mixer $MX_i$ mixes the reception signal $Sr_i$ with the local signal L, so that a beat signal Bi consisting of the frequency components of a difference signal between both the signals $Sr_i$ and L. Each amplifier $AMP_i$ is in charge of amplifying each beam signal $B_i$. A filtering function to remove unnecessary radio frequency components from each beat signal Bi is also given to each amplifier $AMP_i$.

In the following, the configurations consisting of the mixers $MX_i$, amplifiers $AMP_i$ and A/D converters $AD_i$, which produce the digital data $D_i$ from the reception signals Sri every reception antenna $AR_i$, is called reception channels $ch_i$.

In the present embodiment, a half value angle of the transmission antenna AS is set to 20 degrees (which is defined as −10 to +10 degrees on condition that a direction directly facing a vehicle is set to 0 degrees). Further, the reception antennas $AR_1$ to $AR_N$ are arranged at intervals d of 7.2 mm. The radio frequency oscillator 12 is configured to oscillate radio of which wavelength is 3.9 mm (nearly 77 GHz).

Also in the presented embodiment, a directional area Am is defined as an azimuthal region realized when a phase difference $\Delta\theta$ between two reception signals supplied from adjacent two reception signals $AR_i$ and $AR_{i+1}$ is $(2m-1)\pi$ to $(2m+1)\pi$ [rad] (m is an integer). Setting of the above arrangement interval "d" of the reception antennas and the wavelength of radio waves to be used allows each directional area Am to have an angular width of 32 degrees. Particularly, a directional area A0 allowing the phase difference $\Delta\theta$ between two reception signals from adjacent two antennas to be $-\pi$ to $+\pi$ [rad] (m=0) is set to −16 degrees to +16 degrees.

In this radar apparatus 2, a radar wave which is converted into a frequency-modulated continuous wave (FMCW) is transmitted through the transmission antenna AS by the transmitter 4, and its reflected wave is received by each of the reception antennas $AR_1$ to $AR_N$l. Responsively, each reception channel $ch_i$ causes each mixer $MX_i$ to mix a reception signal $Sr_i$ from each reception antenna $AR_i$ with the local signal L from the transmitter 4, so that a beat signal $B_i$ is produced. The beat signal $B_i$ has frequency components that correspond to a difference between the reception signal $Sr_i$ and the local signal L. This beam signal $B_i$ is amplified by each amplifier $AMP_i$, in which unnecessary radio frequency components are also removed from the beat signal. The amplified beat signal $B_i$ is then converted to digital data $D_i$ through sampling repeated in each A/D converters $AD_i$.

The signal processor 10 is configured to have a known microcomputer of which essential components are a CPU, ROM and RAM, an input port to which the data from the A/D converter unit 8 is given, a digital signal processor (DSP) to execute a fast Fourier transform (FFT), and others.

During each period of measurement time consisting of a rising modulation (a frequency of the transmission signal Ss is gradually increased) and a falling modulation (the frequency is gradually decreased), the sampling operation carried out in the A/D converter unit 8 produces digital data $D_i$. Hence the signal processor 10 uses the digital data $D_i$ to detect a target and to calculate a distance from the detected target and a relative speed and direction of the detected target, whenever each period of measurement time is ended. The signal processor 10 also executes processing for correcting the direction detected through the above target detection processing.

Under the target detection processing, the digital data $D_i$ is subjected to FFT processing and other types of processing, channel by channel, with the result that frequency components based on the reflected wave from each target are specified, whereby the target is detected. Using a known technique for the FMCW radar, each of the detected targets is subjected to detection of a distance and a relative speed thereof. Concurrently, the direction of each target is calculated based on the channel-to-channel phase difference $\Delta\theta$ of a frequency component of the reception signal reflected from the same target. How to calculate the direction in a practical way will do any kind of technique as long as it uses information about the phase difference $\Delta\theta$. For instance, techniques called DBF (digital beam forming) and ESPRIT (European Strategic Program for Research and Development in Information Technology) can be used for the signal processing.

Meanwhile, the above direction correcting processing is carried out, as a first step, to obtain a direction on the assumption that there is no phase aliasing in the phase difference $\Delta\theta$ between reception signals respectively detected through each channel (i.e., $|\Delta\theta|<\pi$); that is, the target is present in the direction area A0. Hence, the direction correcting processing is then carried out, as a second step, to correct the obtained direction so as to remove the phase aliasing therefrom.

Figure 6:
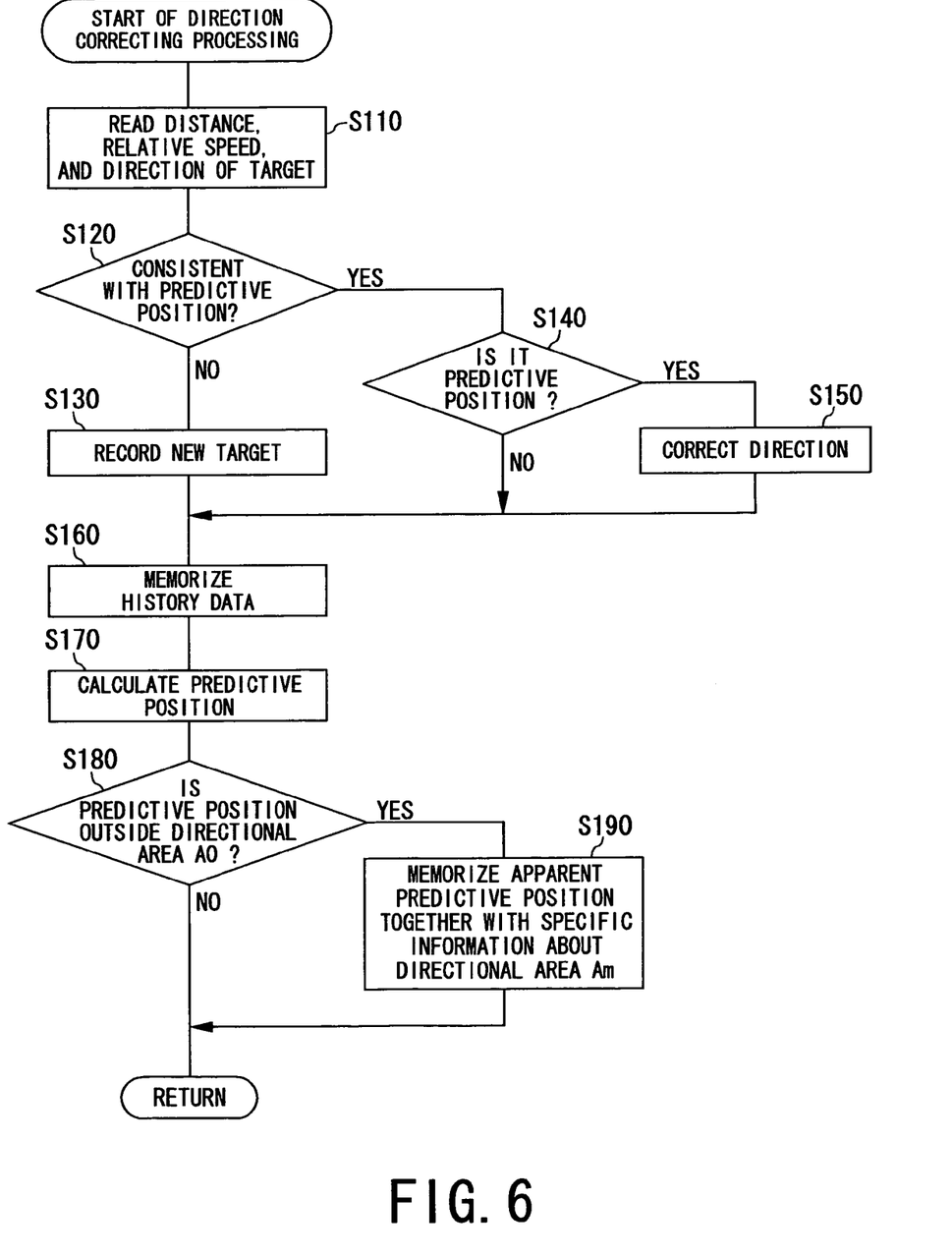
FIG. 6 is a flowchart showing how to correct the direction, which is carried out in the first embodiment.

This direction correcting processing will now be detailed with reference to a flowchart shown in FIG. 2. This processing is carried out for each of the targets detected by the above target detecting processing.

When the direction correcting processing is activated, this processing begins with step S110, where, as concerning each target to be processed (hereinafter, referred to as "objective target,") a distance, relative speed, and direction of the objective target, which have been calculated by the target detecting processing, are read in. Then the processing is moved to step S120, at which, for each target detected during a period of time of measurement of last time, a comparison is made between a predictive position (or an apparent predictive position) to be calculated respectively at later-described steps S170 to S190 and the position and distance of each target (hereinafter, referred to as "detected position") read at the foregoing steps S110. And it is determined whether or not the predictive positions include a position consistent with the detected position.

If there is no such a position, which is consistent with the detected position, in the predictive positions, the processing is made to proceed to step S130, the objective target is memorized as a new target, before going to step S160. In contrast, if the predictive positions include a position that agrees with the detected position, the processing advances to step S140.

At step S140, on the basis of pieces of information attached to the predictive positions, it is then determined whether or not a predictive position consistent with the detected position is an apparent predictive position. When this determination reveals that the predictive position consistent with the detected position is an actual predictive position, not the apparent predictive position, the processing is then carried out at step S160.

In contrast, when the above determination reveals that the predictive position consistent with the detected position is the apparent predictive position, the processing is moved to step S150, whereat a directional area Am within which the actual predictive position resides is determined on the basis of information attached to the predictive position and the direction is corrected in compliance with the determined directional area Am. The processing is then moved to step S160.

Practically, when an angular width of each directional area is expressed by "Φ" and a direction obtained under the target detecting processing is expressed by "$\delta_0$," an actual direction "α" can be computed on the following formula:

$$\alpha = \alpha_0 + 2m\Phi \quad (1),$$

in which "m" denotes the number of the directional area.

At step S160, various pieces of information are memorized as history data about the objective target, such information including the distance and relative speed calculated in the target detecting processing, and, directions calculated in the target detecting processing or the corrected direction if the direction correcting processing has been carried out at step S150. The processing is then shifted to step S170, at which the history data memorized at step S160 is used to calculate a predictive position (i.e., a predictive distance and a predictive direction) at which the objective target should be detected during the next measurement period.

The processing is then shifted to step S180, at which it is determined whether or not the predictive position resides within the directional area A0. If it is determined that the predictive position resides within the directional area A0, the processing is ended with no further processing performed. However, when it is determined that the predictive position resides outside the directional area A0, the processing is shifted to step S190. At this step S190, an apparent predictive position residing within the directional area A0 is calculated and the number "m" of a directional area Am within which the actual predictive position resides is memorized as information attached to the predictive position, together with the apparent predictive position, before the processing is terminated.

In the present embodiment, the apparent predictive position corresponds to a direction obtained by replacing the predictive direction calculated at step S170 with a direction within a directional area A0 (i.e., an apparent direction) obtained using computation with no consideration given to the phase aliasing about the phase difference Δθ. Concretely, when the predictive direction is indicated as "$\alpha_p$" and the directional area Am within which the predictive position resides is indicated as "Am," the apparent predictive direction "$\alpha_{op}$" can be expressed by the following formula (2):

$$\alpha_{op} = \alpha_p - 2m\Phi \quad (2)$$

Accordingly, through the processing stated above, the radar apparatus 2 of the present embodiment is able to cope with the difficulty explained before using FIG. 3, in which a target first detected within the direction area A0 is moved into an adjacent direction A+1 (as expressed by the solid line) so that the target is erroneously detected as if it still resides at positions different from the actual ones (as expressed by the dashed line). In the preferred embodiment, even such as case is caused, the history data about the target is used to determine a directional area Am (m=+1 in FIG. 3) in which the target actually exists. Hence, both of the determined directional Area Am and the apparent position (i.e., apparent direction "$\alpha_o$") to be detected within the directional area A0 allow an actual position (i.e., actual direction "α") to be obtained correctly.

The radar apparatus 2 according to the present embodiment is therefore able to find out the direction of a target, even it is located outside the directional area A0. Hence this radar apparatus 2 has the capability of enlarging its detectable range for targets.

In addition, for realizing such an enlarged detectable range, it is unnecessary for the radar apparatus 2 to narrow the interval of arrangement between two of the reception antennas $AR_1$ and $AR_N$. It is also unnecessary to use an antenna system whose gain sharply changes at the boundaries of the directional area A0. There is no necessity of particular changing specifications at the antenna unit, so that the radar apparatus 2 can be upgraded about its functions with a production cost thereof suppressed.

Moreover, unlike the conventional apparatus that employs the two-system antennas with arrangement intervals are different every antenna system, it is not required to configure the apparatus so that the same reception processing is performed every antenna system. Only the direction correcting processing, which is relatively simple, is added to the original reception processing, with the result that the identical operations and advantages to those of the two-system antenna apparatus can be obtained. Compared to the conventional apparatuses, an amount of processing carried out by the reception unit can also be reduced largely.

In the present embodiment, the target detecting processing composes direction calculating means, while the processing at steps S110 to S120, S140, S170 to S190 correspond to region determining mans, the processing at step S150 corresponds to correction means, and the processing at S160 corresponds to memorization means.

(Second embodiment)

Figure 7:
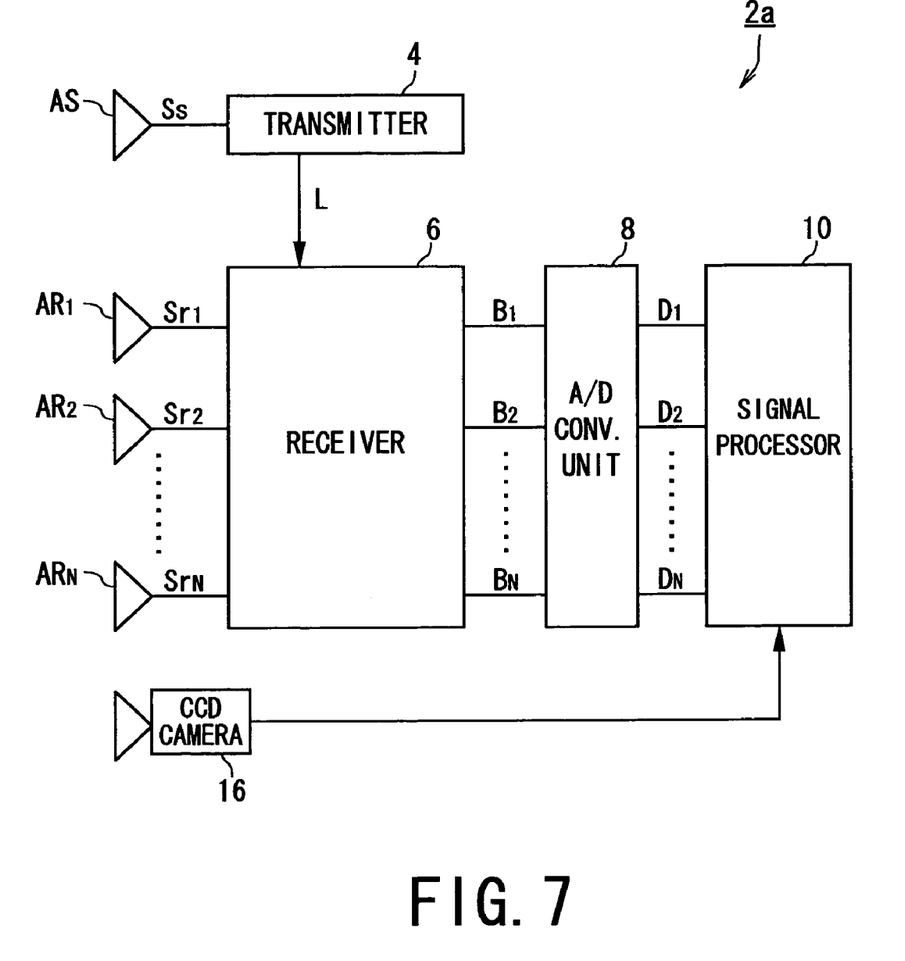
FIG. 7 is a block diagram showing the entire configuration of a radar apparatus serving as a direction detecting apparatus according to a second embodiment of the present invention.
Figure 8:
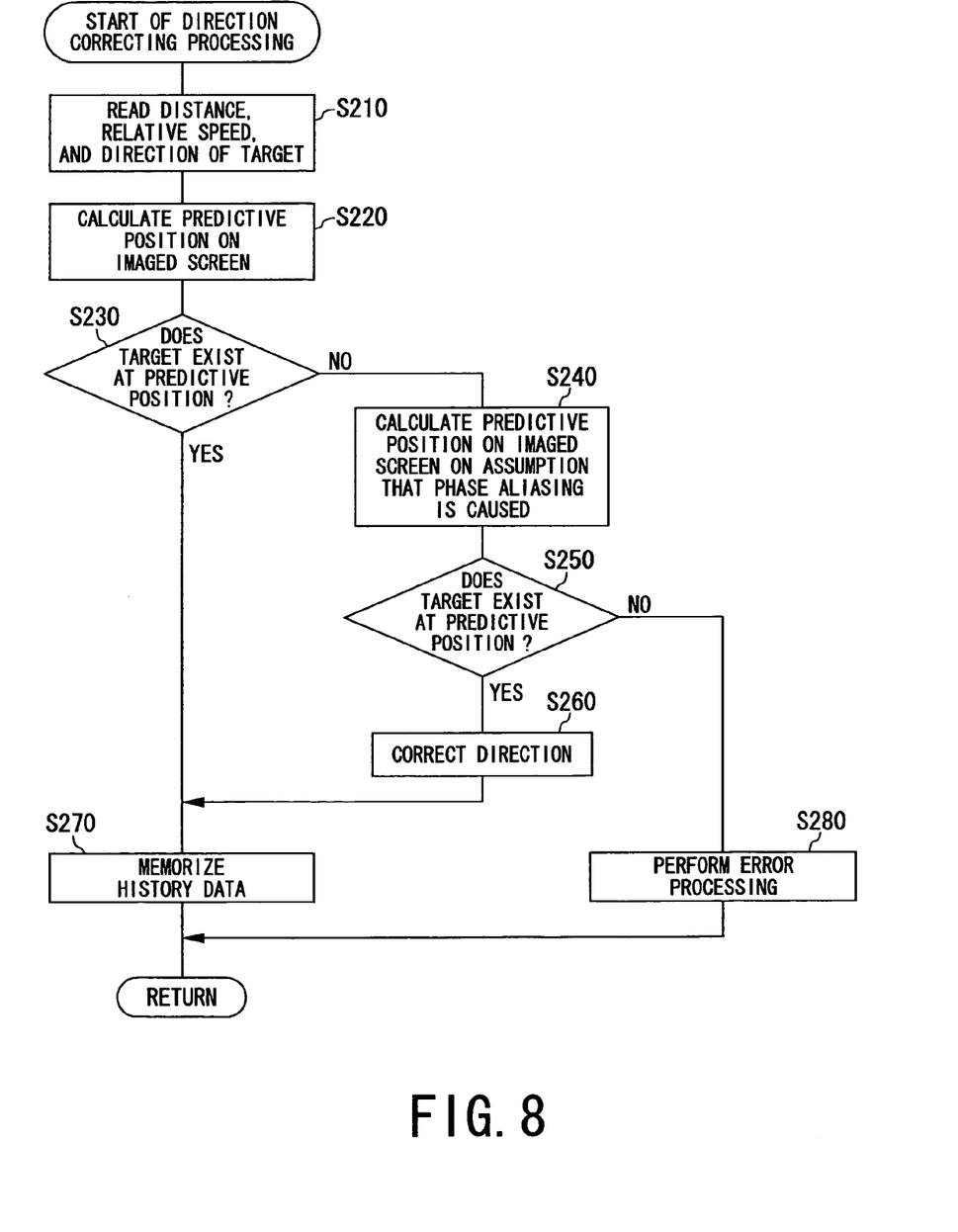
FIG. 8 is a flowchart showing how to correct a direction, which is carried out in the second embodiment.
Figure 9:
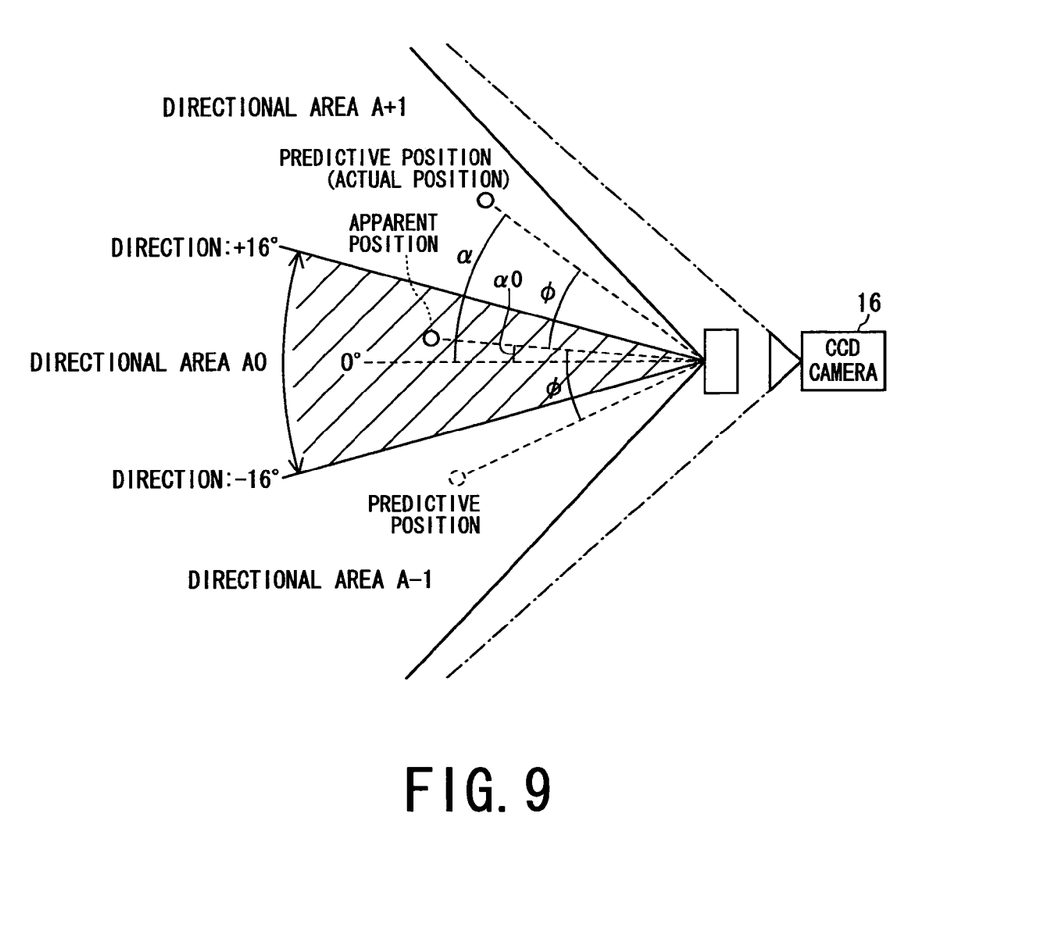
FIG. 9 explains an operation performed in the second embodiment.

Referring to FIGS. 7 to 9, a second embodiment of the present invention will now be described.

FIG. 7 is a block diagram showing the entire configuration of a radar apparatus 2a according to the second embodiment.

This radar apparatus 2a differs from that explained in the first embodiment in only part of both the configuration and signal processing carried out by the signal processor 10, so that the same or identical components of the radar apparatus 2a as or to the radar apparatus 2 are given the same references.

As shown in FIG. 7, in addition to the configurations of the radar apparatus 2 explained in the first embodiment, the radar apparatus 2a is provided with a CCD camera 16 capable of imaging an area wider than and including the directional area A0. Such a wider area ranges, for example, from −30 degrees to +30 degrees. The signal processor 10 is configured to perform target detecting processing to detect targets using digital data $D_i$ taken in through the A/D converter unit 8, target recognizing processing to recognize targets using image data acquired by the CCD camera 16, and direction correcting processing to correct the directions of the targets detected under the target detecting processing by using a recognized result of the target recognizing processing.

Of the above various types of processing, the target detecting processing is totally identical to that explained in the first embodiment, thus omitting the explanation thereof.

The target recognizing processing is configured to extract, through image processing such as pattern recognition, regions on CCD images, the regions showing that the possibility that the targets exist is high. Various ways of recognizing such regions have been known, and any kind of way can be used in the present embodiment. Since how to recognize targets has no direct relation with the present invention, the recognition way is omitted from being detailed.

The direction correcting processing, which differs in processing contents from that in the first embodiment, will now be explained according to a flowchart shown in FIG. 8. This correction processing is carried out for each target detected under the target detecting processing, though not shown in FIG. 8.

In response to the activation of this direction correcting processing, at step S210, concerning each target to be processed (objective target), a distance, relative speed, and direction thereof obtained under the target detecting processing are read in. Then at step S220, the read-in distance and direction are subjected to computation of a position of the objective target to be detected on the images from the CCD camera 16. This computation can be done using a known method for mapping a three-dimensional position onto a two-dimensional plane.

At Step S230, a recognized result under the target recognizing processing is applied to the determination whether or not the target exists at the position figured out at step S220. If it is determined that the target exists at the figured-out position, the processing is shifted directly to step S270, while if it is not determined so, the processing is moved to step S240.

At step S240, a direction is again calculated on condition that the phase difference $\Delta\theta$ used for calculating the direction under the target detecting processing has suffered from the phase aliasing, and this again-calculated direction is used to calculate a position (predictive position) at which the target is to be detected on the imaged screen. In this calculation, directions "α" are calculated respectively corresponding to the phase difference $\Delta\theta$, for each of the direction areas Am )within a range imaged by the CCD camera 16) other than the direction area A0.

Practically, as shown in FIG. 9, when a direction calculated in the target detecting processing (i.e., an apparent direction) is denoted by "$\alpha_0$," the foregoing formula (1) can be used to compute directions "$\alpha(=\alpha_0+2m\Phi)$" for each of possible numerals m (in the case of FIG. 9, m=±1). Each of the computed directions "α" is then subjected to computation of predictive positions on the imaged screen.

Then at step S250, the result of the target recognizing processing is applied to determination whether or not the target exists at any of the predictive positions computed at step S240. If the determination is affirmative, that is, the target exists at any predictive position, the processing is shifted to step S260. At this step S260, the direction used for the calculation of the predictive positions is designated as a direction of the target, that is, the direction is corrected, before going to step S270.

At step 270, various pieces of information are memorized as history data about the objective target, such information including the distance and relative speed of the objective target calculated in the target detecting processing, and, directions calculated in the target detecting processing or the determined direction if a direction is determined at step S260. The processing is then ended.

Meanwhile, it is determined at step S250 that the target does not exist at any of the predictive positions computed at step S240, the processing is shifted to step S280. At step S280, error processing is performed such that the objective target is discarded, and then the processing is finished.

As described above, the radar apparatus 2a according to the present embodiment operates to check the data obtained by transmitting and receiving the radar wave on the basis of the data imaged by the CCD camera 16, so that a target-existing direction (directional area Am) is determined. It is therefore possible that, even if information about the phase difference $\Delta\theta$ deriving from the radar wave suffers from the aliasing, the directional area Am determined on both the data from the radar wave and the CCD camera 16 and the apparent position (i.e., apparent direction "$\alpha_0$") detected within the directional area A0 are used to decide an actual position (i.e., actual direction "α") with precision. It is therefore possible to provide the equivalent advantages to the radar apparatus 2 in the first embodiment.

In the present embodiment, the CCD camera 16 composes imaging means, the target detecting processing corresponds to distance calculating means, the processing at steps S220 and S240 corresponds to mapping means, and the processing at step S230 and S250 corresponds to the determination means.

Other variations of the foregoing first and second embodiments can be provided as well.

One variation is that the radar foregoing apparatus with a plurality of reception antennas can be replaced with a radar apparatus equipped with a plurality of transmission antennas (in this configuration, one or more reception antennas are acceptable).

Another variation is concerned with the half angular-value width of the antenna system. In the foregoing embodiments, the half angular-value width of the antenna system is set to a value approximately equal to that of the directional area A0. However, this is not a definitive list, the half angular-value width may be widened more to positively detect targets residing outside the directional area A0.

Still, another variation concerns the imaging device according to the present invention. This imaging device is not always limited to the CCD camera, but a laser imaging apparatus may also be adopted.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2002-339601 filed on Nov. 22, 2002 including the specification, claims, drawings and summary is incorporated herein by reference in its entirety.

What is claimed is:

1. An apparatus for detecting a direction of a target to be detected which resides in a spatial area to be tracked using radio tracking, the apparatus comprising:
   a plurality of transmission/reception channels causing a difference between phases of two reception signals to be received through two adjacent transmission/reception channels of the transmission/reception channels, the transmission/reception channels including a transmission antenna transmitting radio waves to cover the entire spatial area in response to a transmission signal to be given, a reception antenna receiving reflected radio waves coming from the spatial area so as to produce the two reception signals in accordance with the reflected radio waves, and a receiver processing the two reception signals into processed signals;
   a direction calculating device calculating the direction of the target based on the phase difference in the reception signals on the assumption that the phase difference is within a range of $-\pi$ to $+\pi$[rad];
   a range determining device determining that the target currently exists in one of a plurality of azimuthal angle ranges respectively corresponding to ranges sectioned in the spatial area between $(2m-1)\pi$ to $(2m+1)\pi$ [rad] (where m is an integer); and
   a direction correcting device correcting the direction calculated by the direction calculating device according to a result determined by the range determining device.

2. The apparatus according to claim 1, further comprising a memory device for memorizing history information in relation to positional information including at least the direction target by target,
   wherein the range determining device is configured to determine the azimuthal angle range of the basis of the history information memorized by the memory device.

3. The apparatus according to claim 1, further comprising an imaging device acquiring a two-dimensional image through a field of view of an angular range being wider than and including the azimuthal angle range corresponding to the range of $-\pi$ to $+\pi$ [rad] which is the difference between the phase of the two reception signals; and
   a distance calculating device calculating a distance between the apparatus and the target based on both of the transmission and the processed signals,
   wherein the range determining device comprising:
      a mapping member configured to map, every azimuthal angle range, a position at which the target is to be detected on the two-dimensional image acquired by the imaging device on the basis of each direction calculated using the phase difference between the reception signals on the assumption that the phase difference is within each of ranges defined by $(2m-1)\pi$ to $(2m+1)\pi$ [rad] and the distance calculated by the distance calculating device;
      a first determination member configured to determine whether or not the target is imaged at each position on the two-dimensional image acquired by the mapping member; and
      a second determining member configured to determine the azimuthal angle range in which the target exists, on the basis of a determined result of the first determination member.

4. The apparatus according to claim 3, wherein the imaging device is a CCD camera.

5. The apparatus according to claim 1,
   wherein the transmission antenna is composed of one transmission antenna that forms part of one transmission channel,
   wherein the reception antenna is composed of a plurality of reception antennas that form part of a plurality of reception channels, and
   wherein the plurality of transmission/reception channels are composed of a combination of the one transmission channel and the plurality of reception channels.

6. The apparatus according to claim 5, wherein the plural reception antennas are linearly arranged and are spaced apart at equal intervals.

7. The apparatus according to claim 6,
   wherein the one transmission channel includes the transmission antenna and a transmitter for providing the transmission signal to the transmission antenna,
   wherein each of the plurality of reception channels includes a path connected to each of the plural reception antennas, each path including a mixer, an amplifier, and an analog-to-digital converter arranged in order from each reception antenna, and
   wherein each mixer receives a corresponding one of the reception signals from each reception antenna and a logical signal, and mixes the received reception signal with the local signal to produce a mixed signal,
   each amplifier amplifies the mixed signal from each mixer to produce an amplified signal, and
   each analog-to-digital converter converts the amplified signal from each amplifier to produce a corresponding digital signal.

8. The apparatus according to claim 1, wherein the radio waves are millimeter wave-band radio frequency waves.

9. The apparatus according to claim 2,
   wherein the transmission antenna is composed of one transmission antenna that forms part of one transmission channel,
   wherein the reception antenna is composed of a plurality of reception antennas that form part of a plurality of reception channels, and
   wherein the plurality of transmission/reception channels are composed of a combination of the one transmission channel and the plurality of reception channels.

10. The apparatus according to claim 9, wherein the plural reception antennas are linearly arranged and spaced apart at equal intervals.

11. The apparatus according to claim 10,
    wherein the one transmission channel includes the transmission antenna and a transmitter for providing the transmission signal to the transmission antenna,
    wherein each of the plurality of reception channels includes a path connected to each of the plural reception antennas, each path including a mixer, an amplifier, and an analog-to-digital converter arranged in order from each reception antenna, and
    wherein each mixer receives a corresponding one of the reception signals from each reception antenna and a local signal, and mixes the received reception signal with the local signal to produce a mixed signal,
    each amplifier amplifies the mixed signal from each mixer to produce an amplified signal, and each analog-to-digital converter converts the amplified signal from each amplifier to produce a corresponding digital signal.

12. The apparatus according to claim 3,
wherein the transmission antenna is composed of one transmission antenna that forms part of one transmission channel,
wherein the reception antenna is composed of a plurality of reception antenna that form part of a plurality of reception channels,
wherein the plurality of transmission/reception channels are composed of a combination of the one transmission channel and the plurality of reception channels.

13. The apparatus according to claim 12, wherein the plural reception antennas are linearly arranged and spaced apart at equal intervals.

14. The apparatus according to claim 13,
wherein the one transmission channel includes the transmission antenna and a transmitter for providing the transmission signal to the transmission antenna,
wherein each of the plurality of reception channels includes a path connected to each of the plural reception antennas, each path including a mixer, an amplifier, and an analog-to-digital converter arranged in order from each reception antenna, and
wherein each mixer receives a corresponding one of the reception signals from each reception antenna and a local signal, and mixes the received reception signal with the local signal to produce a mixed signal,
each amplifier amplifies the mixed signal from each mixer to produce an amplified signal, and
each analog-to-digital converter converts the amplified signal from each amplifier to produce a corresponding digital signal.

15. An apparatus for detecting a direction of a target to be detected which resides in a spatial area to be tracked using radio tracking, the apparatus comprising:
a plurality of transmission/reception channels causing a difference between phases of two reception signals to be received through adjacent two transmission/reception channels of the transmission/reception channels, the transmission/reception channels including a transmission antenna transmitting radio waves to cover the entire spatial area in response to a transmission signal to be given, a reception antenna receiving reflected radio waves coming from the spatial area so as to produce the reception signal in accordance with the reflected radio waves, and a receiver processing the reception signal into processed signals; and a signal processor configured to
calculate the direction of the target based on the phase difference in the reception signals on the assumption that the phase difference is within a range of $-\pi$ to $+\pi$ [rad],
determine that the target currently exists in one of a plurality of azimuthal angle ranges respectively corresponding to ranges sectioned in the spatial area between $(2m-1)\pi$ to $(2m+1)\pi$ [rad] (where m is an integer), and
correct the direction calculated by the direction calculating device according to a result determined by the range determining device.

16. The apparatus according to claim 15,
wherein transmission antenna is composed of one transmission antenna that forms part of one transmission channel,
wherein the reception antenna is composed of a plurality of reception antennas that form part of a plurality of reception channels, and
wherein the plurality of transmission/reception channels are composed of a combination of the one transmission channel and the plurality of reception channels.

17. The apparatus according to claim 16, wherein the plurality of reception antennas are linearly arranged and are spaced apart at equal intervals.

18. The apparatus according to claim 17,
wherein the one transmission channel includes the transmission antenna and a transmitter for providing the transmission signal to the transmission antenna,
wherein each of the plurality of reception channels includes a path connected to each of the plurality of reception antennas, each path including a mixer, an amplifier, and an analog-to-digital converter arranged in order from each reception antenna, and
wherein
each mixer receives a corresponding one of the reception signals from each of the plurality of reception antennas and a local signal, and mixes the received reception signal with the local signal to produce a mixed signal,
each amplifier amplifies the mixed signal from each mixer to produce an amplified signal, and
each analog-to-digital converter converts the amplified signal from each amplifier to produce a corresponding digital signal.

19. The apparatus according to claim 17, wherein the radio waves are millimeter wave-band radio frequency waves.

* * * * *